(12) United States Patent
Calvarese et al.

(10) Patent No.: US 11,864,078 B2
(45) Date of Patent: Jan. 2, 2024

(54) ENHANCED BROADCAST FUNCTION AT EDGE DEVICES

(71) Applicant: ZEBRA TECHNOLOGIES CORPORATION, Lincolnshire, IL (US)

(72) Inventors: Russell Calvarese, Stony Brook, NY (US); Sean Connolly, Stony Brook, NY (US); David Bellows, Old Westbury, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 47 days.

(21) Appl. No.: 17/698,105

(22) Filed: Mar. 18, 2022

(65) Prior Publication Data

US 2023/0300583 A1    Sep. 21, 2023

(51) Int. Cl.
| | |
|---|---|
| *H04W 4/80* | (2018.01) |
| *H04W 48/18* | (2009.01) |
| *H04W 76/10* | (2018.01) |
| *H04W 48/16* | (2009.01) |
| *H04W 72/30* | (2023.01) |

(52) U.S. Cl.
CPC ............ *H04W 4/80* (2018.02); *H04W 48/16* (2013.01); *H04W 48/18* (2013.01); *H04W 72/30* (2023.01); *H04W 76/10* (2018.02)

(58) Field of Classification Search
CPC ....... H04W 4/80; H04W 76/10; H04W 72/30; H04W 48/16; H04W 48/18
USPC ...................................................... 455/41.2
See application file for complete search history.

(56) References Cited

U.S. PATENT DOCUMENTS

| | | | |
|---|---|---|---|
| 6,472,991 B1 | 10/2002 | Schulman et al. | |
| 9,009,805 B1 * | 4/2015 | Kirkby | H04N 21/4622 709/224 |
| 11,088,871 B1 * | 8/2021 | Lin | H04L 45/02 |
| 11,120,032 B1 * | 9/2021 | Chen | G06F 16/24549 |

(Continued)

OTHER PUBLICATIONS

Dunkels et al. "Making TCP/IP viable for wireless sensor networks." (2003). Retrieved on Apr. 24, 2023 (2404.2023) from <https://www.diva-portal.org/smash/get/diva2:1041597/FULLTEXT01.pdf> entire document.

(Continued)

*Primary Examiner* — April G Gonzales

(57) ABSTRACT

An edge device using broadcasting is disclosed herein. The edge device may include one or more memories and one or more processors communicatively coupled to the one or more memories. In some implementations, the edge device may receive individual sets of data from a plurality of sensors and compile the individual sets of data into a single dataset to be processed by a backend device. The edge device may generate a plurality of advertisements to include a corresponding plurality of portions of the dataset and a corresponding plurality of sequence identifiers. The edge device may broadcast each advertisement, without receiving an acknowledgement of each preceding advertisement. The edge device may receive, from the backend device, an indication of one or more sequence identifiers that were not received. Accordingly, the edge device may retransmit, based on the indication of the sequence identifier(s), a portion of the plurality of advertisements.

25 Claims, 9 Drawing Sheets

(56) References Cited

U.S. PATENT DOCUMENTS

| | | | |
|---|---|---|---|
| 11,696,351 B2* | 7/2023 | Manthrayil Sachidanandan ......... | H04W 4/80 370/329 |
| 2002/0077077 A1* | 6/2002 | Rezvani ................ | H04W 8/005 455/410 |
| 2010/0008272 A1* | 1/2010 | Messinger ............... | H04Q 9/00 370/311 |
| 2019/0253254 A1* | 8/2019 | Brownlee ............. | H04L 9/0618 |
| 2020/0288289 A1* | 9/2020 | Elnajjar ............. | G06Q 30/0265 |
| 2022/0141297 A1* | 5/2022 | Hall ...................... | H04L 67/306 709/224 |
| 2022/0155941 A1* | 5/2022 | Asarikuniyil .... | H04N 21/41407 |
| 2022/0172250 A1* | 6/2022 | Hall ...................... | H04L 63/083 |
| 2022/0215436 A1* | 7/2022 | Volk .................. | G06Q 30/0277 |
| 2023/0177455 A1* | 6/2023 | Bellows ............... | G06Q 10/087 705/28 |

OTHER PUBLICATIONS

Wu et al. "A fog computing-based framework for process monitoring and prognosis in cyber-manufacturing." Journal of Manufacturing Systems 43 (2017): 25-34. Retrieved on Apr. 24, 2023 (Apr. 24, 2023) from <https://par.nsf.gov/servlets/pur/10137114> entire document.

Lavassani et al. "Combining fog computing with sensor mote machine learning for industrial IoT." Sensor 18.5 (2018): Retrieved on Apr. 24, 2023 (Apr. 24, 2023) from <https://www.mdpi.com/1424-82201/18/5/1532> entire document.

International Search Report and Written Opinion for International Application No. PCT/US2023/015183 dated Jun. 14, 2023.

* cited by examiner

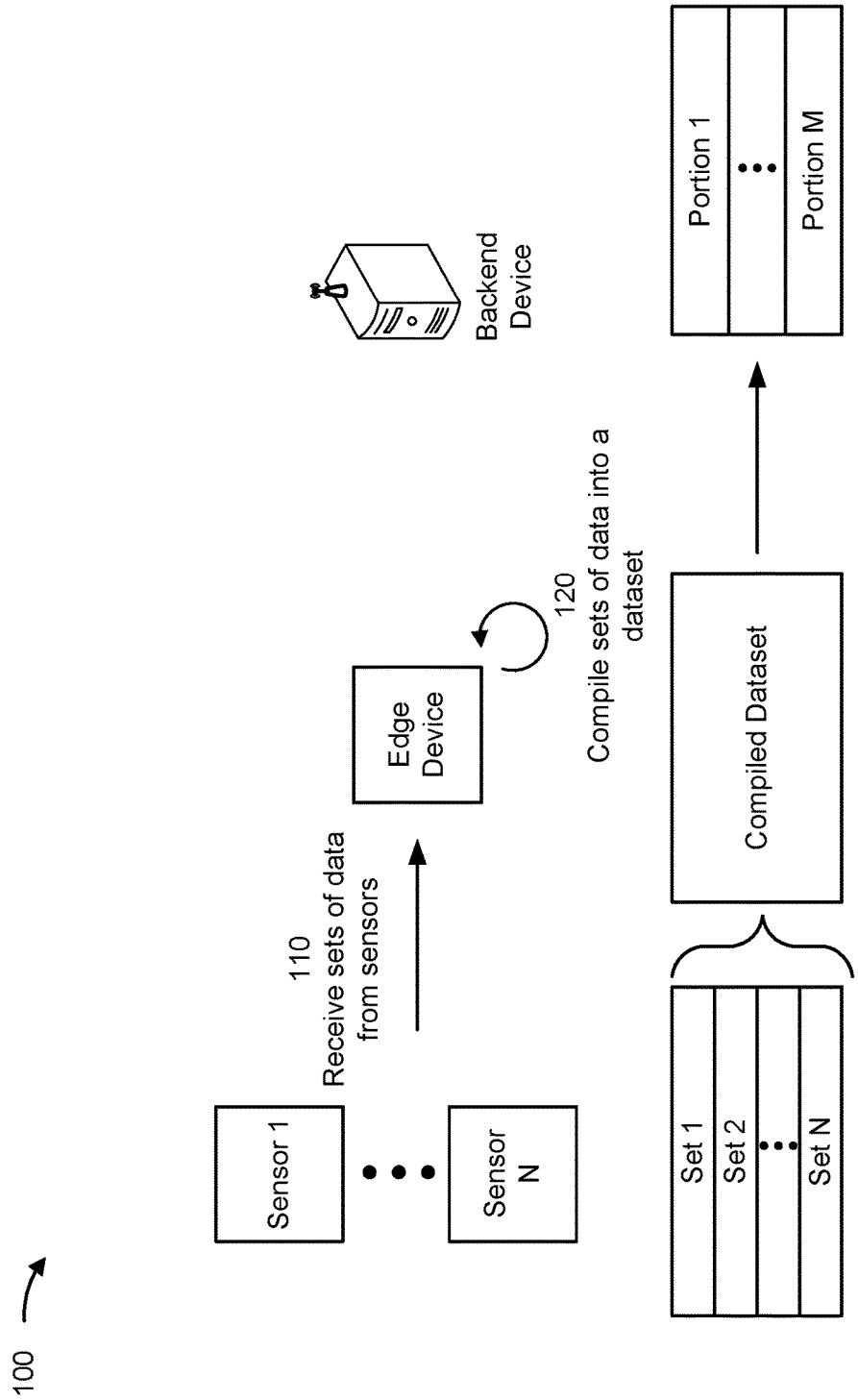

US 11,864,078 B2

ENHANCED BROADCAST FUNCTION AT EDGE DEVICES

BACKGROUND

Many sensors and other small devices are configured to transmit measurements and other data to small edge devices, such as Internet of Things (IoT) devices. Edge devices then transmit the data from multiple sensors to a backend device, such as a smartphone, a router, and/or another device connected to a wider network, such as the Internet. The edge device may function as a peripheral role device, and the backend device may function as a central role device in BLUETOOTH® Low-Energy (BLE) protocol. For example, the edge device may establish a connection with the backend device to transmit the data from the sensors to the backend device. Establishing a connection consumes a large amount of power relative to an advertisement packet at the edge device. Additionally, because each packet will be acknowledged by the backend device and retransmitted if the acknowledgement is not received, the edge device consumes excessive power to retransmit the data and enabling its receiver to receiver the acknowledge. Therefore, there is a need to conserve power at the edge device when communicating large data sets with the backend device.

SUMMARY

Some implementations described herein relate to a method for communicating data using a wireless protocol. The method may include receiving, at an edge device, individual sets of data from a plurality of sensors. The method may include compiling, by the edge device, the individual sets of data into a single dataset that is to be processed by a backend device. The method may include generating, by the edge device, a first advertisement to include a first portion of the dataset and a first sequence identifier associated with the first portion. The method may include generating, by the edge device, a second advertisement to include a second portion of the dataset and a second sequence identifier associated with the second portion. The method may include broadcasting, with a communication setting of the edge device in a mode including a transmitting capability, the first advertisement. The method may include broadcasting, without receiving an acknowledgement associated with the first advertisement, the second advertisement to enable the backend device to process the first portion based on the first sequence identifier, the second portion based on the second sequence identifier, or a combination thereof. The method may include configuring the communication setting of the edge device to a mode including a receiving capability for a time period. The method may include receiving, from the backend device, an indication of one or more sequence identifiers associated with one or more advertisements that were not received. The method may include retransmitting, based on the indication of the one or more sequence identifiers, the first advertisement, the second advertisement, or a combination thereof.

Some implementations described herein relate to an edge device for communicating data using a wireless protocol. The edge device may include one or more memories and one or more processors communicatively coupled to the one or more memories. The one or more processors may be configured to receive individual sets of data from a plurality of sensors. The one or more processors may be configured to compile the individual sets of data into a single dataset that is to be processed by a backend device. The one or more processors may be configured to generate a first advertisement to include a first portion of the dataset and a first sequence identifier associated with the first portion. The one or more processors may be configured to generate a second advertisement to include a second portion of the dataset and a second sequence identifier associated with the second portion. The one or more processors may be configured to broadcast, with a communication setting of the edge device in a mode including a transmitting capability, the first advertisement. The one or more processors may be configured to broadcast, without receiving an acknowledgement associated with the first advertisement, the second advertisement to enable the backend device to process the first portion based on the first sequence identifier, the second portion based on the second sequence identifier, or a combination thereof. The one or more processors may be configured to configure the communication setting of the edge device to a mode including a receiving capability for a time period. The one or more processors may be configured to receive, from the backend device, an indication of one or more sequence identifiers associated with one or more advertisements that were not received. The one or more processors may be configured to retransmit, based on the indication of the one or more sequence identifiers, the first advertisement, the second advertisement, or a combination thereof.

Some implementations described herein relate to a tangible machine-readable medium that stores a set of instructions for a device. The set of instructions, when executed by one or more processors of the device, may cause the device to receive, at the device, individual sets of data from a plurality of sensors. The set of instructions, when executed by one or more processors of the device, may cause the device to compile, by the device, the individual sets of data into a single dataset that is to be processed by a backend device. The set of instructions, when executed by one or more processors of the device, may cause the device to generate, by the device, a set of advertisements including two or more advertisements, where each advertisement includes a corresponding portion of the dataset and a corresponding sequence identifier associated with the corresponding portion. The set of instructions, when executed by one or more processors of the device, may cause the device to broadcast, with a communication setting of the edge device in a mode including a transmitting capability, each advertisement in an order according to the corresponding sequence identifiers, wherein each successive advertisement of the plurality of advertisements is transmitted without receiving an acknowledgement of a preceding advertisement of the set of advertisements. The set of instructions, when executed by one or more processors of the device, may cause the device to configure the communication setting of the edge device to a mode including a receiving capability for a time period. The set of instructions, when executed by one or more processors of the device, may cause the device to receive, from the backend device, an indication of one or more sequence identifiers associated with a subset of the advertisements that were not received. The set of instructions, when executed by one or more processors of the device, may cause the device to retransmit, based on the indication of the one or more sequence identifiers, the subset of the set of advertisements.

Some implementations described herein relate to a method for communicating data using a wireless protocol. The method may include (a) receiving, at an edge device, individual sets of data from a plurality of sensors. The method may include (b) compiling, by the edge device, the individual sets of data into a dataset that is to be processed by a backend device. The method may include (c) generating, by the edge device, a plurality of advertisements, each advertisement including a respective portion of the dataset and a respective sequence identifier, wherein, taken together, the respective portions of the plurality of advertisements comprise the dataset. The method may include (d) broadcasting, with a communication setting of the edge device in a mode including a transmitting capability, at least some of the plurality of advertisements, wherein the broadcasting is performed without receiving an acknowledgement associated with any advertisement of the at least some of the plurality of advertisements being received by a receiving device. The method may include (e) configuring the communication setting of the edge device to a mode including a receiving capability for a predetermined time period. The method may include (f) receiving, at the edge device for the predetermined time period from the receiving device, at least one of (i) an indication of one or more of the plurality of advertisements not having been received; (ii) an indication that all of the plurality of advertisements have been received; or (iii) no indication. The method may include (g) responsive to receiving the (i) indication of the one or more of the plurality of advertisements not having been received, broadcasting, with the communication setting of the edge device in the mode including the transmitting capability, the one or more of the plurality of advertisements not having been received, wherein the broadcasting is performed without receiving an acknowledgement associated with any advertisement of the one or more of the plurality of advertisements not having been received.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate implementations of concepts disclosed herein, and explain various principles and advantages of those implementations.

FIGS. 1A-1E are diagrams of an example implementation described herein.

Figure 1B:
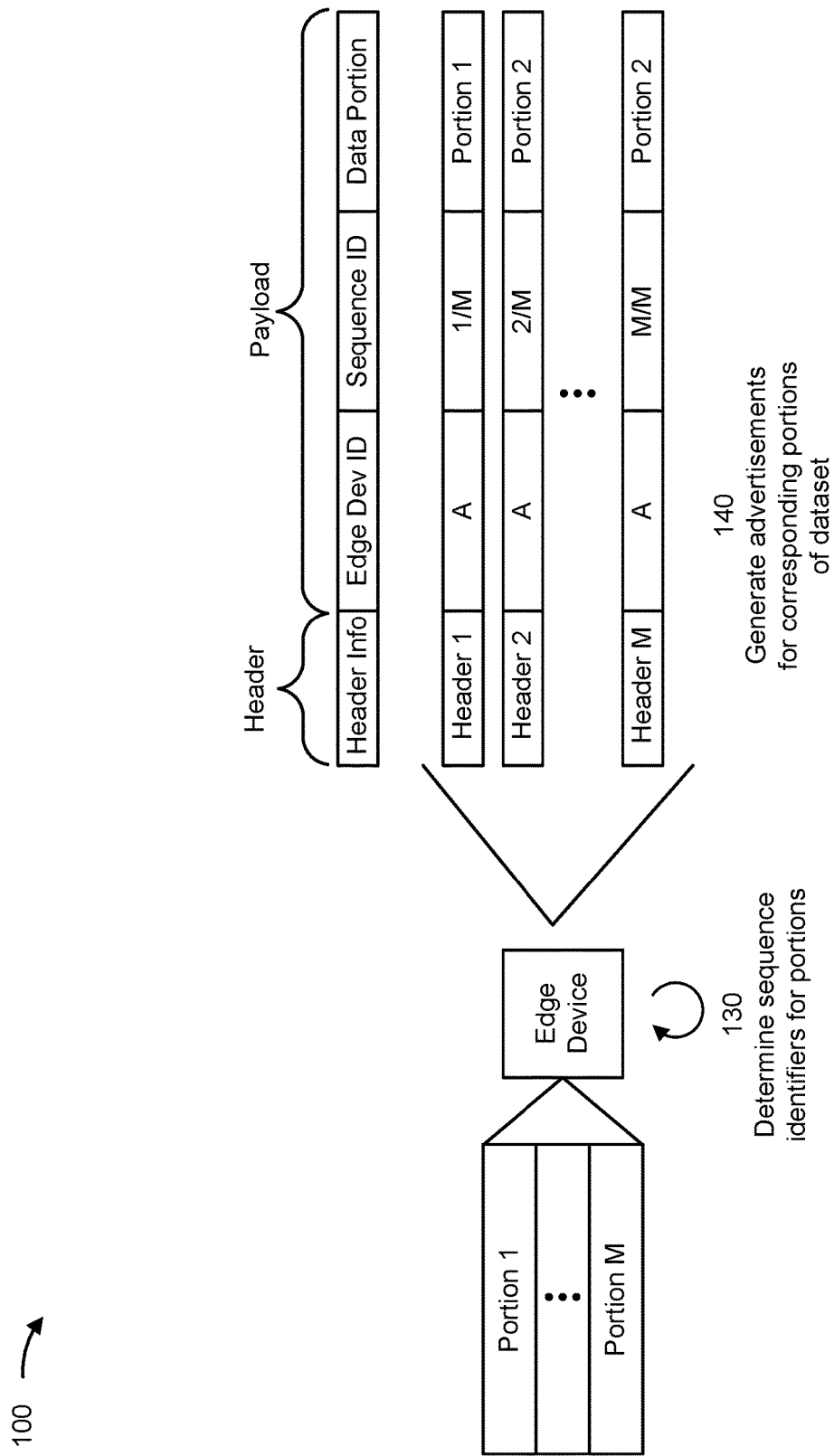

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations described herein.

The apparatus and method elements have been represented where appropriate by conventional symbols in the drawings, showing only those specific details that are pertinent to understanding the implementations described herein so as not to obscure the disclosure with details that will be readily apparent to those of ordinary skill in the art having the benefit of the description herein.

DETAILED DESCRIPTION

The following detailed description of example implementations refers to the accompanying drawings. The same reference numbers in different drawings may identify the same or similar elements.

Sensors and other small devices are often configured to transmit measurements and other data to an edge device, such as an Internet of Things (IoT) device. The edge device may further transmit the data to a backend device, such as a smartphone, a router, and/or another device connected to a wider network, such as the Internet. Accordingly, the edge device may function as a peripheral role device, and the backend device may function as a central role device in BLUETOOTH® Low-Energy (BLE) protocol. However, establishing a connection with the backend device consumes a large amount of power at the edge device. Additionally, because each packet will be acknowledged by the backend device and retransmitted if the acknowledgement is not received, the edge device consumes a large amount of power while transmitting the data.

Rather than establish a connection, advertisement packets may be used. Advertisement packets are not acknowledged, so missed packets are not repeated. While the edge device consumes less power, some data will be lost. Blindly repeating each broadcast packet many times to ensure reception becomes less and less power efficient as the repeat count increases.

By broadcasting the data using advertisements rather than packets over a connection, the edge device can conserve power. Additionally, the edge device can receive an indication of any missed portions of the data from the backend device using a short duration connection and then retransmit the missed portions. Some implementations described herein enable using advertisements to transmit data from multiple sensors and retransmission of missed portions of the data after receiving an indication of the missed portions. As a result, the edge device conserves power by reducing a length of any connections with the backend device and by receiving an indication of missed portions of the data in lieu of individual acknowledgements.

FIGS. 1A-1E are diagrams of an example implementation 100 associated with using broadcasting at an edge device. As shown in FIGS. 1A-1E, example implementation 100 includes sensor devices, an edge device, and a backend device. These devices are described in more detail below in connection with FIG. 2 and FIG. 3.

As shown in FIG. 1A and by reference number 110, multiple sensors (e.g., shown as sensors 1 through N in example 100, where N represents a positive integer larger than 1) may transmit, and an edge device may receive, individual sets of data (e.g., shown as sets 1 through N in example 100). In some implementations, one or more of the sensors may be integrated with the edge device. For example, the sensors may include a temperature sensor, a pressure sensor, and/or another type of sensor formed on a same circuit board as the edge device (or at least a microprocessor and/or a memory of the edge device) or otherwise formed as an integrated circuit (e.g., an application-specific integrated circuit (ASIC) with the edge device). Additionally, or alternatively, the edge device may be at least partially separate (e.g., physically, logically, and/or virtually) from one or more of the sensors. For example, the sensors may be include a temperature sensor, a pressure sensor, and/or another type of sensor adhered or otherwise placed in one location and configured to transmit a set of data to the edge device in a different location.

Accordingly, in some implementations, the edge device may receive one or more of the individual sets of data wirelessly. For example, the sensors may transmit the sets of data to the edge device over-the-air (OTA) periodically and/or on-demand. Additionally, or alternatively, the edge device may receive one or more of the individual sets of data using a wired connection. For example, the sensors may be wired to the edge device (e.g., using a bus on a shared circuit board or one or more wires connecting difference circuit boards).

As further shown in FIG. 1A, and by reference number 120, the edge device may compile the individual sets of data into a single dataset that is to be processed by a backend device. For example, the edge device may decode messages from the multiple sensors in order to extract the individual sets of data therefrom and generate a data structure (e.g., on a memory of the edge device) that includes the data from the individual sets of data. The edge device may use an indexed data structure (e.g., indexed according to identifiers associated with different sensors and/or times at which the individual sets of data were received).

Furthermore, the single dataset may be divided into multiple portions (e.g., shown as portions 1 through M in example 100, where M represents a positive integer larger than 1). Each portion may be associated with one or more of the sensors and may be associated with a range of time in which the data in the portion was received. In some implementations, the portions may correspond to the individual sets of data (e.g., such that N=M). Alternatively, the edge device may generate fewer portions than a quantity of the individual sets of data (e.g., combining data from sensors of a same type, such as combining data from all pressure sensors, combining data from all interior temperature sensors, or combining data from all exterior humidity sensors, among other examples, and/or combining data received within a same time range). Accordingly, as shown by reference number 130, the edge device may determine sequence identifiers for the portions of the dataset. For example, the edge device may assign sequence integers (e.g., starting with zero or one) to each portion of the dataset.

As shown in FIG. 1B, and by reference number 140, the edge device may generate a set of advertisements corresponding to the portions of the dataset. As used herein, "advertisement" refers to a packet generated for broadcast (as opposed to unicast or multi-cast) using one or more frequencies reserved for broadcast (e.g., reserved according to specifications, such as BLUETOOTH® Low-Energy (BLE) specifications, and/or reserved by a controller, such as the backend device).

In one example, each advertisement may include a protocol data unit (PDU) with a header and with a payload. The payload may include the portion of the dataset corresponding to the advertisement, and the header may be as described below. At a link layer of the edge device, the PDU may be encoded as a payload in a data packet along with a preamble, an access address, and a cyclic redundancy check (CRC).

Accordingly, each advertisement includes a corresponding portion of the dataset (e.g., as the payload of the advertisement). Additionally, as further shown in FIG. 1B, each advertisement includes a corresponding sequence identifier associated with the corresponding portion, as described above. In some implementations, the edge device may further encode an identifier of the edge device (e.g., an alphanumeric identifier that may be assigned by the backend device) in each advertisement.

Additionally, or alternatively, the edge device may encode a header in each advertisement (e.g., according to BLE specifications). For example, the header may indicate a PDU type and a length of the advertisement.

Figure 1C:
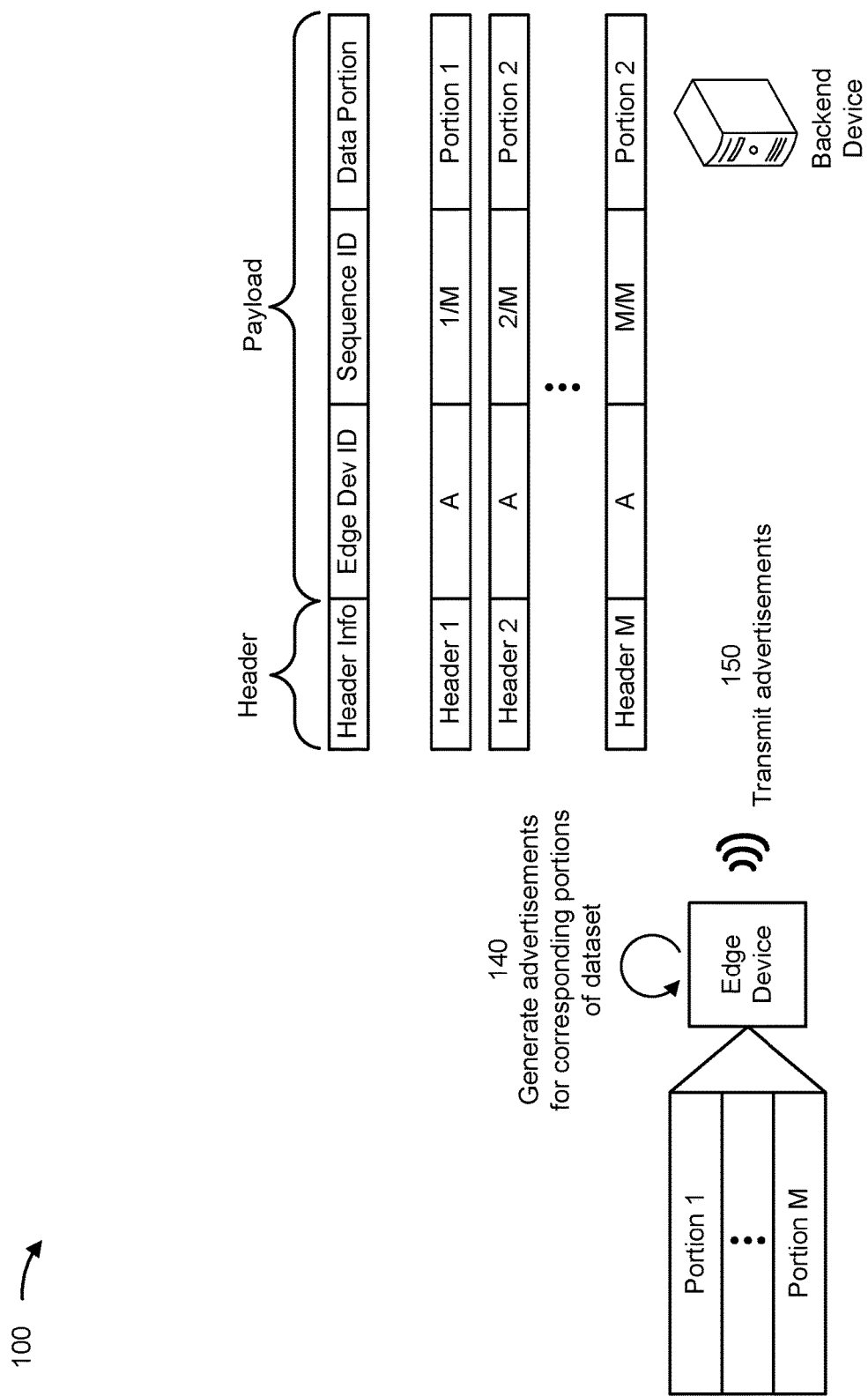

Thus, as shown in FIG. 1C and by reference number 150, the edge device may broadcast, and the backend device may receive, the set of advertisements. The edge device may transmit the set of advertisements in an order according to the corresponding sequence identifiers. For example, the edge device may transmit the first advertisement (associated with sequence identifier 1 in example 100) followed by the second advertisement (associated with sequence identifier 2 in example 100), and so on until a final advertisement (associated with sequence identifier M in example 100).

Each successive advertisement of the plurality of advertisements is transmitted without the edge device receiving an acknowledgement of a preceding advertisement of the set of advertisements. As a result, the edge device conserves power because transmitting advertisements is generally less power-consuming than transmitting data using a connection with the backend device and also receiving acknowledgements from the backend device. Additionally, the edge device may wait between advertisement transmissions (e.g., when available power associated with the edge device does not satisfy a minimum threshold or is otherwise low) because the edge device is not maintaining a communication link with the backend device.

In some implementations, an amount of time between broadcasting each advertisement is fixed. Accordingly, the edge device may transmit the plurality of advertisements according to a schedule (e.g., one every 500 milliseconds (ms) or one every second, among other examples). Additionally, or alternatively, the edge device may broadcast each advertisement dynamically. For example, the edge device may track a power level associated with the edge device and transmit an advertisement each time the power level satisfies a threshold associated with broadcasting one advertisement. In a combinatory example, the edge device may transmit the plurality of advertisements according to an advertisement period but adjust the advertisement period based on the power level. For example, the edge device may decrease the advertisement period when the power level satisfies a power level threshold and may increase the advertisement period when the power level does not satisfy the power level threshold. Although described as using the same threshold, other implementations may use different thresholds to determine when to increase the advertisement period and when to decease the advertisement period (e.g., in order to implement hysteresis).

Accordingly, the backend device is able to process the portions of the dataset based on the corresponding sequence identifiers. For example, the backend device can decode each advertisement and assemble a data structure encoding the dataset that corresponds to the data structure generated at the edge device.

Figure 1D:
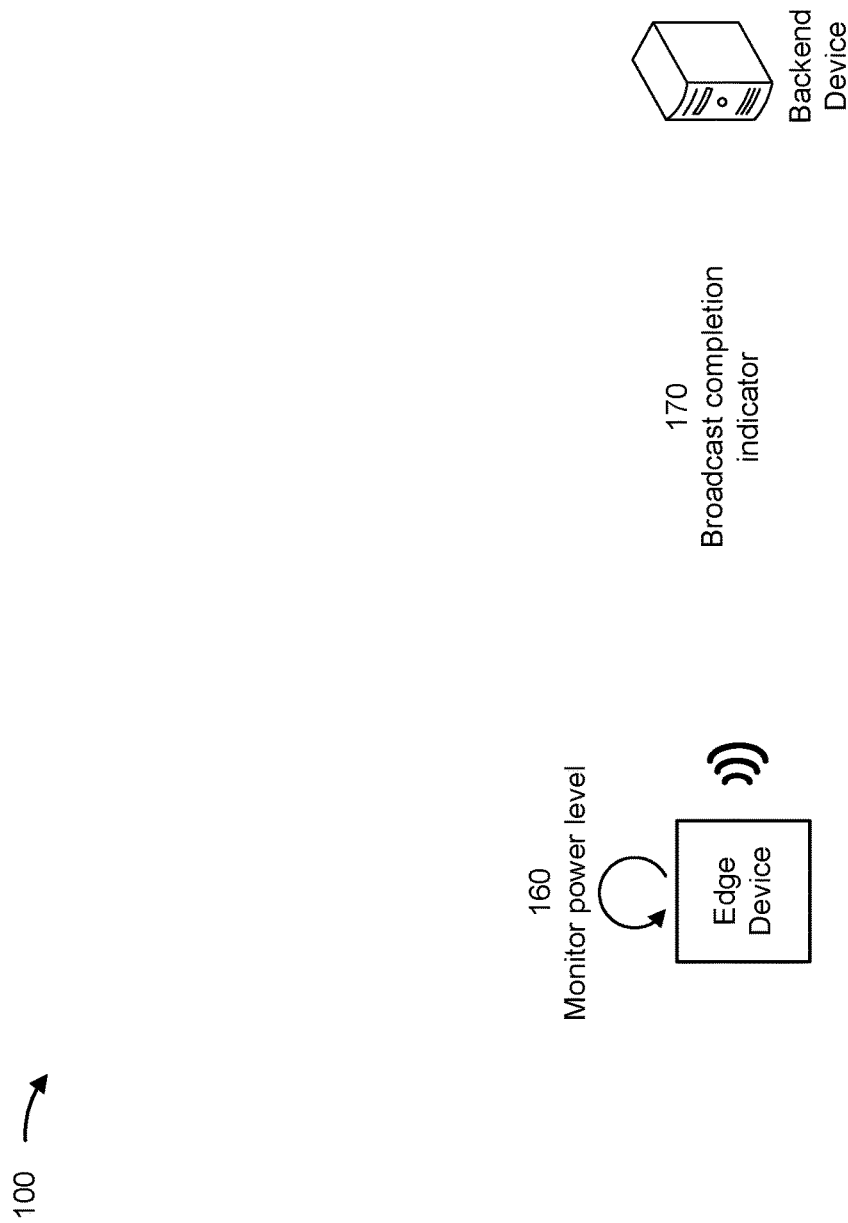

As shown in FIG. 1D, and by reference number 160, the edge device may monitor a power level associated with the edge device. For example, the edge device may include a battery that charges using ambient light and/or other environmental sources. Additionally, or alternatively, the battery may charge using wireless signals (whether ambient signals and/or signals directed from the backend device for the purpose of charging the battery) converted into electricity by the edge device.

When the power level associated with the edge device satisfies a threshold, as shown by reference number 170, the edge device may broadcast, and the backend device may receive, a completion indicator that indicates that all of the individual sets of data have been transmitted. For example, the completion indicator may be an advertisement with a payload of all zeroes, a payload including a final sequence identifier associated with the final advertisement of the set of advertisements, and/or another indication that every advertisement, in the set of advertisements, has been broadcast.

The edge device may broadcast the completion indicator without receiving an acknowledgement associated with the final advertisement.

After broadcasting the completion indicator, the edge device may configure the communication setting of the edge device to a mode including a receiving capability for a time period. Accordingly, the completion indicator allows the edge device to control when the edge device will receive, which is a more power-consuming operation as compared with transmitting. For example, the edge device may wait to transmit the completion indicator until the power level satisfies the threshold, as described above. As a result, the edge device can ensure that the edge device has enough power to establish and maintain a communication link with the backend device (e.g., as described in connection with reference number 180).

In some implementations, the time period is fixed. Accordingly, the edge device may listen for packets from the backend device for one second, two seconds, three seconds, and so on, among other examples. Additionally, or alternatively, the edge device may dynamically determine the time period. For example, the edge device may use a formula that accepts one or more factors as input and outputs the time period for which the edge device should listen. The one or more factors may include a time of day (e.g., listening for a longer time period during the day as compared with during the night), a current hour (e.g., listening for a longer time period during one or more hours indicated as busy), a current weather forecast (e.g., listening for a longer time period during a sunny forecast), a previous indication from the backend device (e.g., listening for a longer time period after receiving an indication that overhead associated with the backend device is low), a throughput prediction (e.g., based on an error rate associated with recent communications from the edge device and/or a signal strength measured at the edge device), and/or a rate of change associated with measurements from the plurality of sensors (e.g., listening for a longer time period when the rate of change satisfies a change threshold), among other examples. Additionally, or alternatively, the formula may include a machine learning model trained on historical data associated with energy consumption and throughput of the edge device. In a combinatory example, the edge device may select from a plurality of fixed time periods according to the one or more factors.

Although described above as separate, the final advertisement in the set of advertisements may function as the completion indicator. For example, at least the first advertisement may indicate a total quantity of advertisements in the set of advertisements such that the backend device may determine which sequence identifier indicates the final advertisement. To allow the backend device to determine which sequence identifier indicates the final advertisement, even when the first advertisement is missed, the edge device may indicate the total quantity in every advertisement, or at least in an initial plurality of advertisements, in the set of advertisements.

Figure 1E:
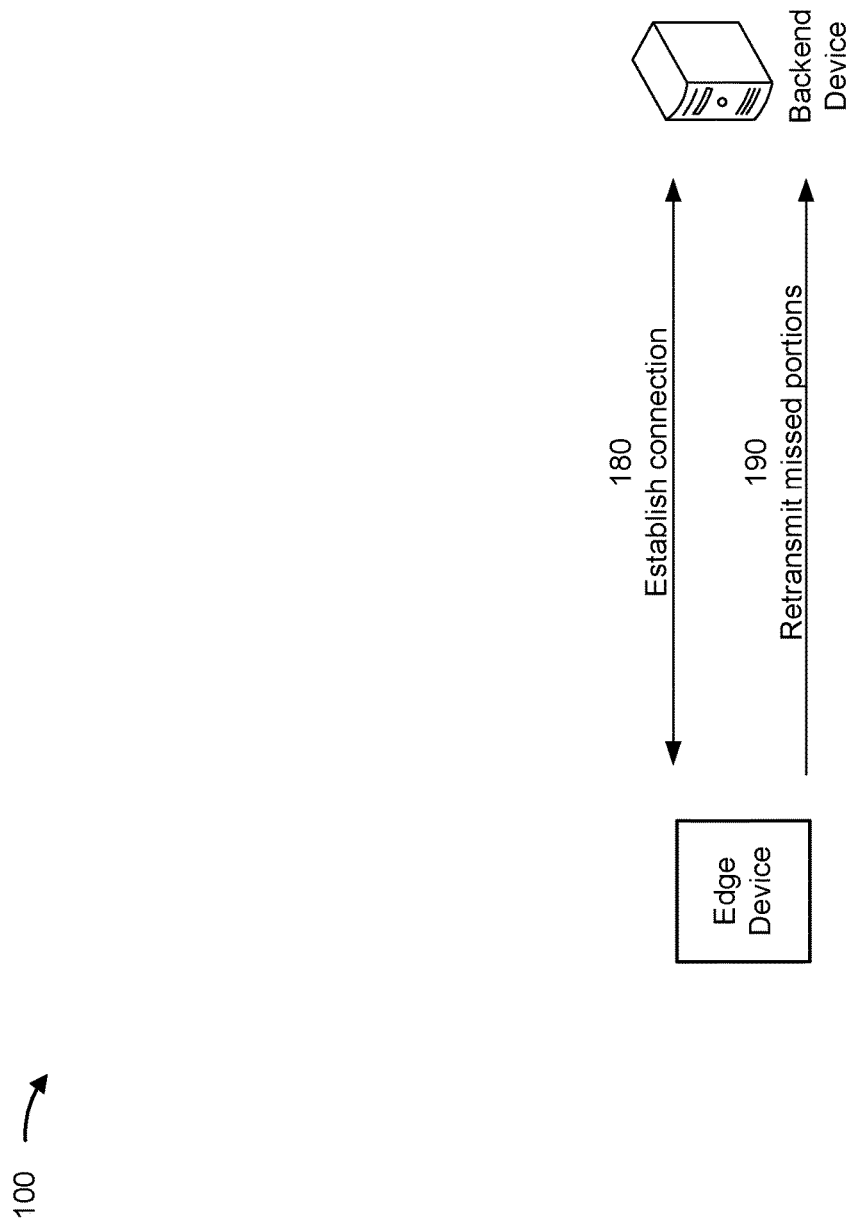

Based on receiving the completion indicator, the backend device can establish a communication link with the edge device during the time period, as shown in FIG. 1E and by reference number 180. For example, the communication link may be established via a BLE connection protocol. Alternatively, when the time period expires, and the edge device does not receive anything from the backend device, the edge device may rebroadcast the completion indicator (or the final advertisement in the set of advertisements when the final advertisement functions as the completion indicator). Accordingly, the edge device may again configure the communication setting of the edge device to the mode including a receiving capability for a time period and establish a communication link with the backend device during the time period. In some implementations, the edge device may iteratively rebroadcast the completion indicator (or the final advertisement in the set of advertisements when the final advertisement functions as the completion indicator) until successfully establishing a communication link with the backend device.

Accordingly, using the communicating link, the backend device may transmit, and the edge device may receive, an indication of one or more sequence identifiers that were not received. For example, the backend device may have received the first advertisement, the third advertisement, and the final advertisement of a five advertisement set, such that the backend device indicates second identifiers for the second advertisement and the fourth advertisement in the indication.

In some implementations, the backend device may determine whether to establish a communication link with the edge device according to a priority associated with the edge device. For example, the backend device may communicate with a set of edge devices, including the edge device, and may prioritize (e.g., in an ordered ranking or according to two or more priority groups) the edge devices. The backend device may prioritize the edge devices based on capabilities associated with the edge devices (e.g., lower priority for edge devices with greater power capacity and/or lower priority for edge devices with greater transmit strength, among other examples) and/or determined needs associated with the edge devices (e.g., higher priority for edge devices that transmit data more frequently and/or higher priority for edge devices that have not transmitted for a longer period of time, among other examples).

Accordingly, as shown by reference number 190, the edge device may retransmit, and the backend device may receive, based on the indication of the one or more sequence identifiers, a subset of the set of advertisements. The subset corresponds to the sequence identifiers that the backend device indicates as not having received.

In some implementations, the edge device retransmits the subset using the communication link. For example, the edge device may re-encode the subset of the set of advertisements as BLE packets and transmit the BLE packets using the communication link. As a result, the edge device reduces latency between receiving the indication of the one or more sequence identifiers that were not received and completing transmission of the dataset to the backend device.

As an alternative, the edge device may terminate the communication link with the backend device and rebroadcast the subset of the set of advertisements. For example, the edge device may repeat operations described in connection with reference numbers 150 and 170 (optionally with reference number 160) with respect to the subset. As a result, the edge device conserves additional power by terminating the communication link after a short period of time.

In some implementations, the edge device may iteratively establish a communication link with the backend device, receive an indication of one or more sequence identifiers that were not received, if any, terminate the communication link, and rebroadcast any advertisements associated with the one or more sequence identifiers that were not received. Accordingly, the edge device may continue until receiving an indication that all sequence identifiers were received from the backend device.

By using techniques as described in connection with FIGS. 1A-1E, the edge device conserves power by reducing a length of any connections with the backend device. Additionally, the edge device conserves power by receiving an indication of missed portions of the data from the backend device in lieu of individual acknowledgements.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
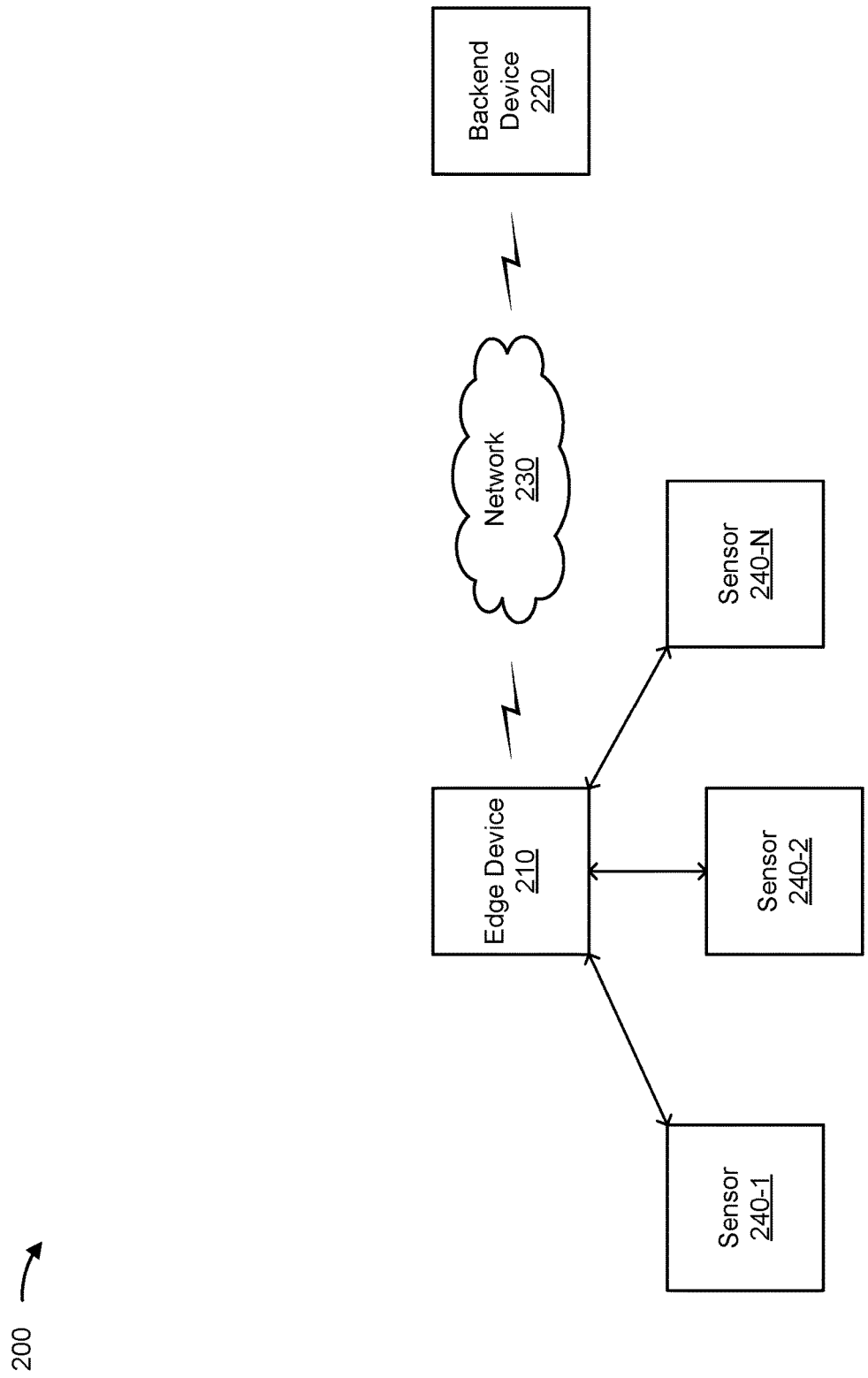
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an edge device 210, a backend device 220, a network 230, a plurality of sensors 240 (shown as sensor 240-1, sensor 240-2, . . . , sensor 240-N in example 200). Devices of environment 200 may interconnect via wired connections, wireless connections, or a combination of wired and wireless connections.

The edge device 210 includes one or more devices capable of receiving, generating, storing, processing, and/or transmitting data and commands with the sensors 240 and with the backend device 220. The edge device 210 may include a communication device and/or a computing device. For example, the edge device 210 may include a wireless communication device, a microprocessor paired with a transceiver, an ASIC paired with a transceiver, or a similar type of device.

The backend device 220 includes one or more devices capable of receiving, storing, and/or routing information from the edge device 210, as described elsewhere herein. The backend device 220 may include a communication device and/or a computing device configured to communicate with the edge device 210 OTA over short distances (e.g., 20 meters or fewer). For example, the backend device 220 may include a router, a base station, and/or another type of device with a transceiver configured to communicate wirelessly with the edge device 210 (e.g., using BLE and/or another similar protocol). Additionally, or alternatively, the backend device 220 may include a wireless communication device, a user device (e.g., a mobile phone, a user equipment, a laptop computer, a tablet computer, a desktop computer), or a similar type of device. The backend device 220 may forward information from the edge device 210 to a server, such as an application server, a client server, a web server, a database server, a host server, a proxy server, a virtual server (e.g., executing on computing hardware), or a server in a cloud computing system. In some implementations, the backend device 220 may forward the information to computing hardware used in a cloud computing environment.

The network 230 includes one or more wired and/or wireless networks. For example, the network 230 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 230 enables communication among the devices of environment 200.

The sensors 240 include temperature sensors, pressure sensors, humidity sensors, optical sensors, or other similar types of sensors. The sensors 240 are capable of transmitting measurements and other data to the edge device 210, whether over a wired and/or wireless connection. In some implementations, the sensors 240 also receive commands from the edge device 210, such as commands to begin taking measurements, commands to stop taking measurements, and/or commands to provide measurements to the edge device 210. Additionally, or alternatively, the sensors 240 may transmit measurements to the edge device 210 periodically.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
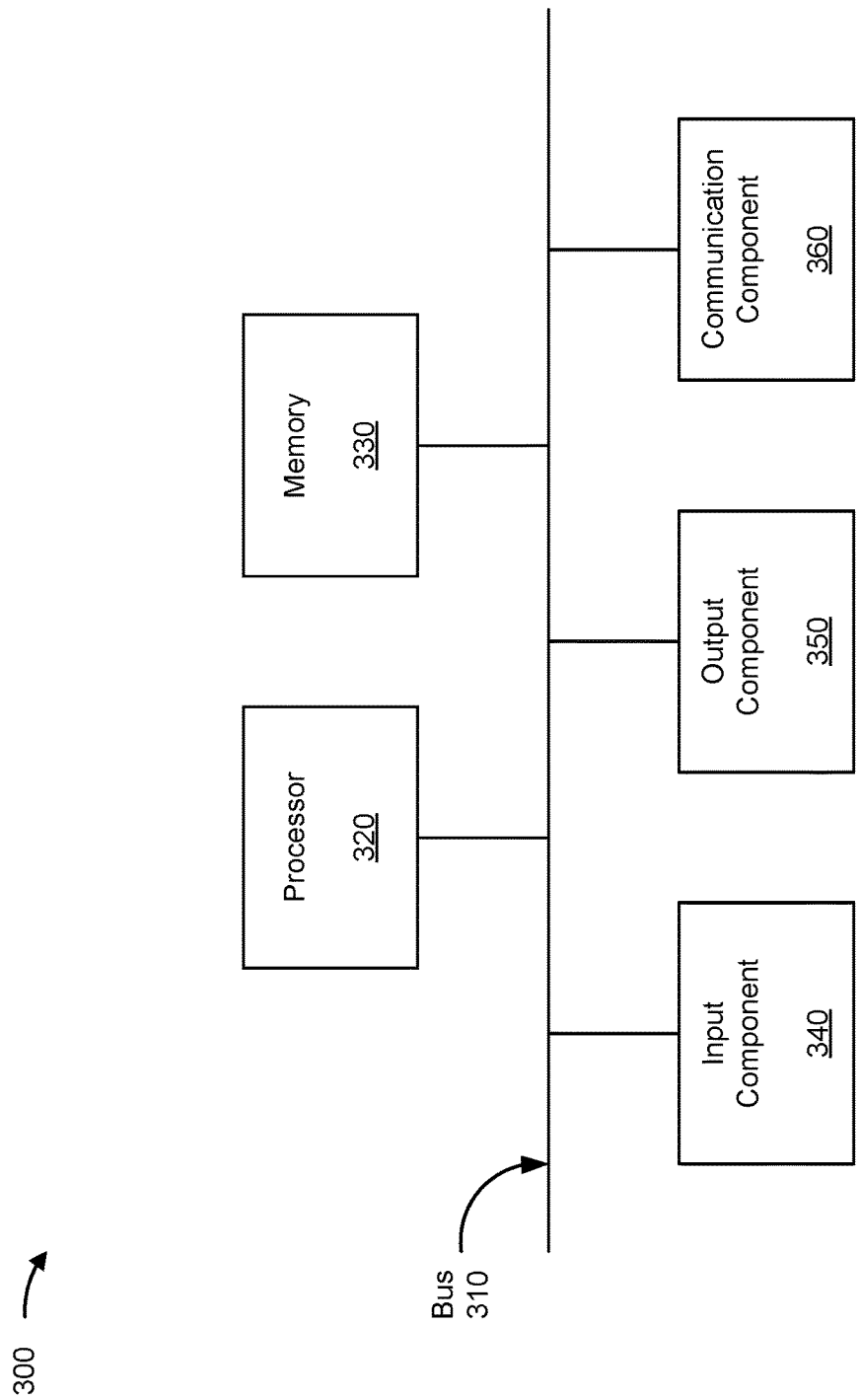
FIG. 3 is a diagram of example components of one or more devices of FIG. 2.

FIG. 3 is a diagram of example components of a device 300, which may correspond to an edge device, a backend device, and/or a sensor. In some implementations, edge device 210, backend device 220, and/or sensor(s) 240 may include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
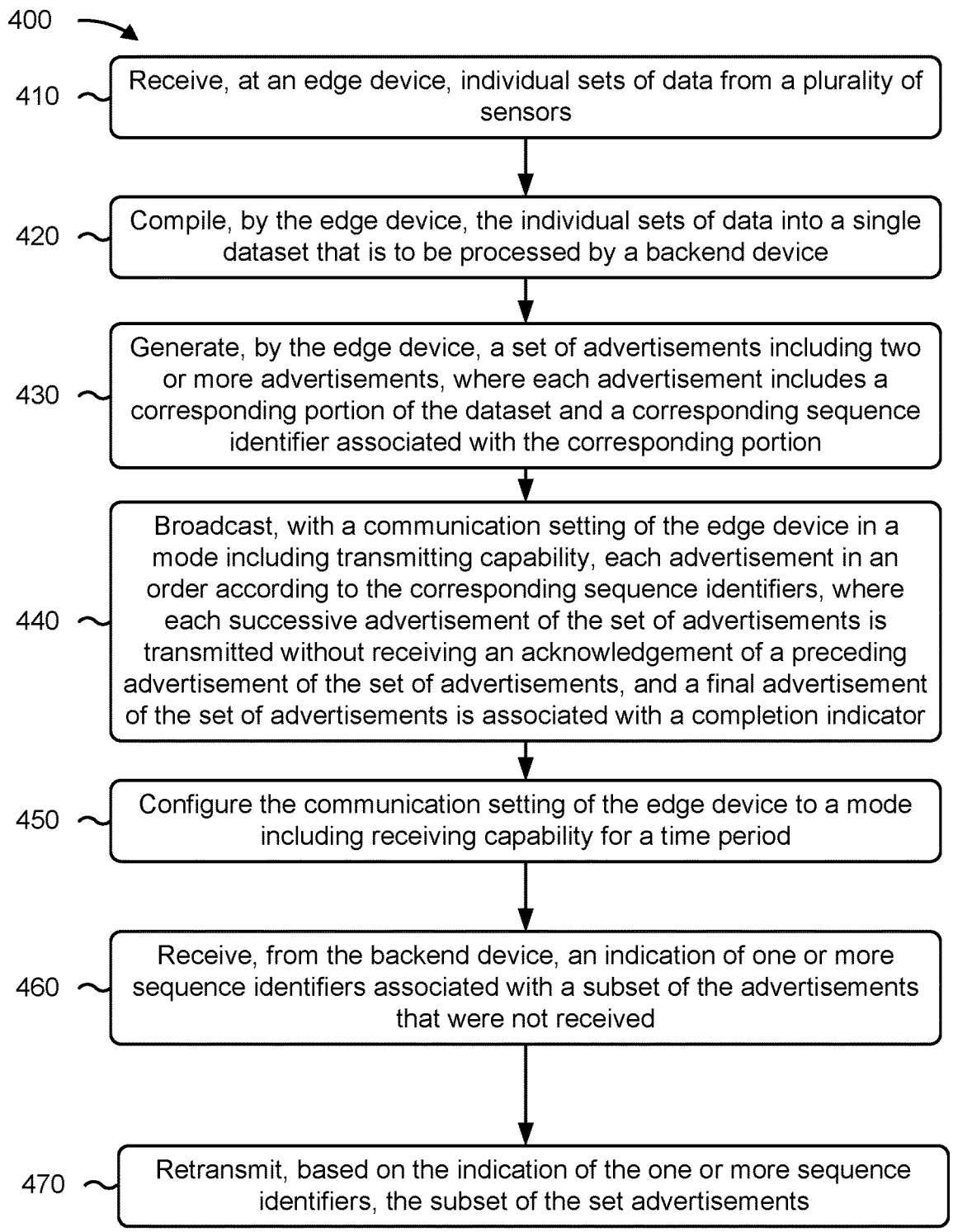
FIGS. 4 and 5 are flowcharts of example processes relating to using broadcasting at edge devices.

FIG. 4 is a flowchart of an example process 400 associated with using broadcasting at edge devices. In some implementations, one or more process blocks of FIG. 4 may be performed by an edge device (e.g., edge device 210). In some implementations, one or more process blocks of FIG. 4 may be performed by another device or a group of devices separate from or including the edge device, such as backend device 220 and/or sensor(s) 240. Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving, at an edge device, individual sets of data from a plurality of sensors (block 410). For example, the edge device may receive, at an edge device, individual sets of data from a plurality of sensors, as described above.

As further shown in FIG. 4, process 400 may include compiling the individual sets of data into a single dataset that is to be processed by a backend device (block 420). For example, the edge device may compile the individual sets of data into a single dataset that is to be processed by a backend device, as described herein.

As further shown in FIG. 4, process 400 may include generating a set advertisements, where each advertisement includes a corresponding portion of the dataset and a corresponding sequence identifier associated with the corresponding portion (block 430). For example, the edge device may generate the set of advertisements, as described herein.

As further shown in FIG. 4, process 400 may include broadcasting, with a communication setting of the edge device in a mode including a transmitting capability, each advertisement in an order according to the corresponding sequence identifiers (block 440). For example, the edge device may broadcast each advertisement in an order according to the corresponding sequence identifiers, as described herein. The edge device may transmit each successive advertisement of the set of advertisements without receiving an acknowledgement of a preceding advertisement of the set of advertisements.

The set of advertisements may be BLUETOOTH® Low-Energy (BLE) advertisements. For example, the set of advertisements may be broadcast via a BLE advertisement protocol.

As further shown in FIG. 4, process 400 may include configuring the communication setting of the edge device to a mode including a receiving capability for a time period (block 450). For example, the edge device may configure the communication setting of the edge device to a mode including a receiving capability for a time period, as described herein. In some implementations, the communication setting of the edge device is configured to the mode including the receiving capability based on broadcasting a final advertisement of the set of advertisements.

As further shown in FIG. 4, process 400 may include receiving, from the backend device, an indication of one or more sequence identifiers associated with a subset of the advertisements that were not received (block 460). For example, the edge device may receive, from the backend device, an indication of one or more sequence identifiers associated with a subset of the advertisements that were not received, as described herein. In some implementations, process 400 further includes establishing a communication link with the backend device, such that the indication is received using the communication link. For example, the communication link may be established via a BLUETOOTH® Low-Energy (BLE) connection protocol.

Process 400 may further include rebroadcasting a final advertisement of the set of advertisements based on not receiving the indication, of the one or more sequence identifiers associated with a subset of the advertisements that were not received, during the time period.

As further shown in FIG. 4, process 400 may include retransmitting, based on the indication of the one or more sequence identifiers, the subset of the set of advertisements (block 470). For example, the edge device may retransmit, based on the indication of the one or more sequence identifiers, the subset of the set of advertisements, as described herein. In some implementations, the portions of the dataset, corresponding to the subset of the set of advertisements, are transmitted using the communication link.

In some implementations, process 400 further includes broadcasting, without receiving an acknowledgement associated with the second advertisement, a completion indicator that indicates that all of the individual sets of data have been transmitted, such that the communication setting of the edge device is configured to the mode including the receiving capability based on broadcasting the completion indicator. Additionally, process 400 may include determining that a power level associated with the edge device satisfies a threshold, such that the completion indicator is transmitted based on the power level satisfying the threshold. Additionally, or alternatively, process 400 may include rebroadcasting the completion indicator based on not receiving the indication, of the one or more sequence identifiers associated with the subset of the set of advertisements that were not received, during the time period.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
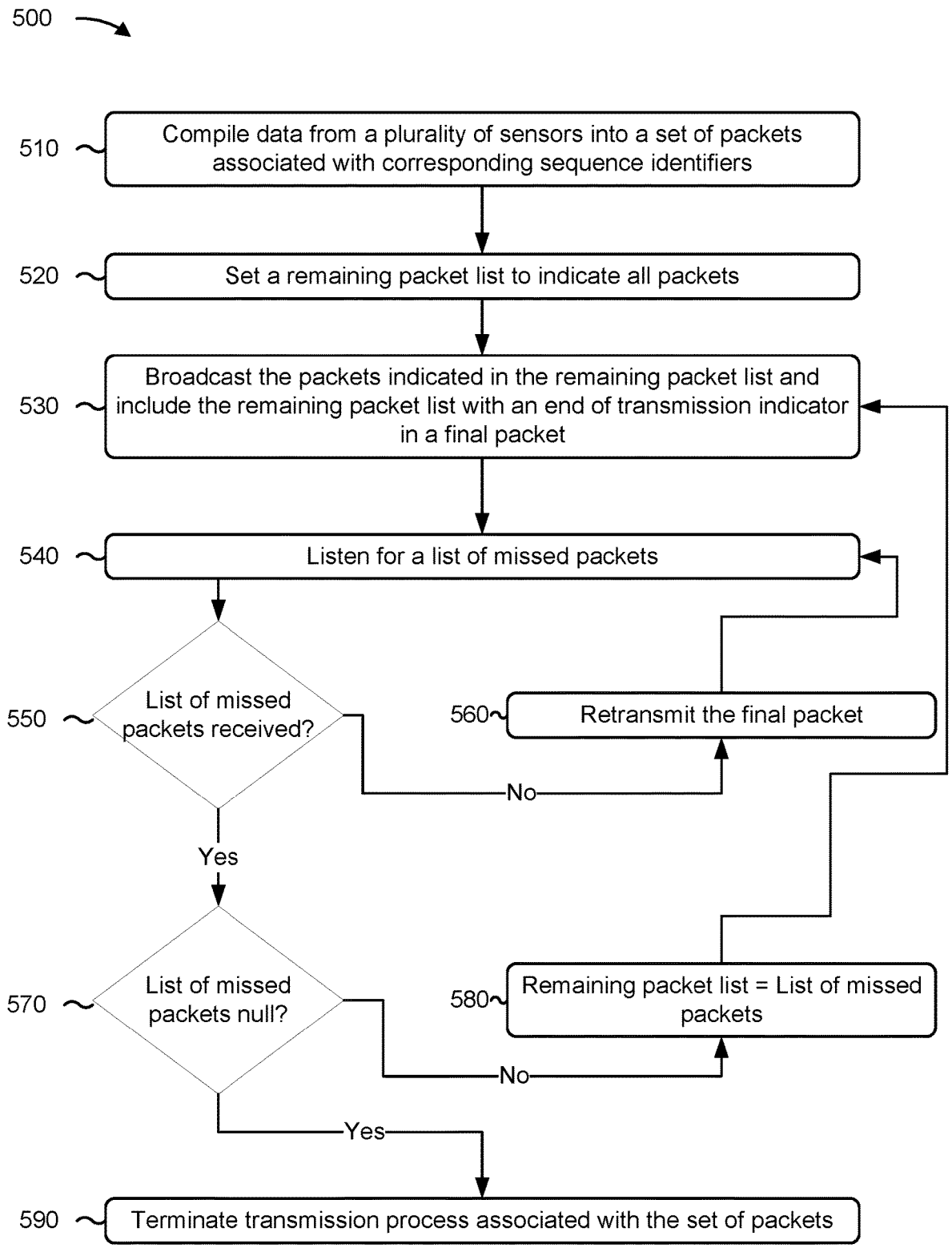

FIG. 5 is a flowchart of an example process 500 associated with using broadcasting at edge devices. In some implementations, one or more process blocks of FIG. 5 may be performed by an edge device (e.g., edge device 210). In some implementations, one or more process blocks of FIG. 5 may be performed by another device or a group of devices separate from or including the edge device, such as backend device 220 and/or sensor(s) 240. Additionally, or alternatively, one or more process blocks of FIG. 5 may be performed by one or more components of device 300, such as processor 320, memory 330, input component 340, output component 350, and/or communication component 360.

As shown in FIG. 5, process 500 may include compiling (e.g., at the edge device) data from a plurality of sensors, into a set of packets associated with corresponding sequence identifiers (block 510). For example, the edge device may compile the data into a set of BLE advertisements.

As further shown in FIG. 5, process 500 may include setting a remaining packet list (or another similar variable) to indicate all packets in the set of packets (block 520). For example, the edge device may set an array (or another similar data structure) to include all corresponding sequence identifiers associated with the set of packets.

As further shown in FIG. 5, process 500 may include broadcasting the packets indicated in the remaining packet list and including, in a final packet, the remaining packet list and an end of transmission indicator (block 530). For example, the edge device may broadcast each advertisement in an order according to the corresponding sequence identifiers and then include a copy of the data structure representing the remaining packet list in the final packet.

As further shown in FIG. 5, process 500 may include listening for a list of missed packets (e.g., from a backend device) (block 540). For example, the edge device may actively receive, and attempt to demodulate and decode, wireless signals in order to decode the list of missed packets.

As shown by block 550, when the edge device does not receive the list of missed packets, the edge device may retransmit the final packet (block 560). Additionally, the edge device may again listen for a list of missed packets (shown by looping to block 540).

As further shown by block 550, the edge device may receive the list of missed packets. Accordingly, as shown by block 570, when the list of missed packets is not null (or otherwise empty), the edge device may set the remaining packet list to indicate the packets indicated in the list of missed packets (block 580). For example, the edge device may set the array (or another similar data structure representing the remaining packet list) to include the sequence identifiers included in the list of missed packets. Additionally, the edge device may again broadcast the packets indicated in the remaining packet list (shown by looping to block 530).

As further shown by block 570, the edge device may terminate process 500 when the list of missed packets is null (or otherwise empty) (block 590).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In the foregoing disclosure, specific embodiments have been described. However, one of ordinary skill in the art will appreciate that various modifications and changes can be made without departing from the scope of the invention as set forth in the claims below. Accordingly, the specification and figures are to be regarded in an illustrative rather than a restrictive sense, and all such modifications are intended to be included within the scope of present disclosure. Additionally, the described embodiments/examples/implementations should not be interpreted as mutually exclusive, and should instead be understood as potentially combinable if such combinations are permissive in any way. In other words, any feature disclosed in any of the aforementioned examples or implementations may be included in any of the other aforementioned examples or implementations.

As used herein, the term "component" is intended to be broadly construed as hardware, firmware, and/or a combination of hardware and software. As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, or the like) on which machine-readable instructions (e.g., code in the form of, for example, software and/or firmware) can be stored. The instructions may be stored for any suitable duration of time, such as permanently, for an extended period of time (e.g., while a program associated with the instructions is executing), or for a short period of time (e.g., while the instructions are cached, during a buffering process, or the like). Further, as used herein, each of the terms "tangible machine-readable medium," "non-transitory machine-readable medium" and "machine-readable storage device" is expressly defined to exclude propagating signals. That is, as used in any claim herein, a "tangible machine-readable medium," a "non-transitory machine-readable medium," and a "machine-readable storage device," or the like, should not be interpreted as being implemented as a propagating signal.

As used herein, satisfying a threshold may, depending on the context, refer to a value being greater than the threshold, greater than or equal to the threshold, less than the threshold, less than or equal to the threshold, equal to the threshold, not equal to the threshold, or the like.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, as used herein, relational terms such as first and second, top and bottom, or the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

The terms "a" and "an" are defined as one or more unless explicitly stated otherwise herein. Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

The abstract of the disclosure is provided to allow the reader to quickly ascertain the nature of the technical disclosure. It is submitted with the understanding that it will not be used to interpret or limit the scope or meaning of the claims. In addition, in the foregoing description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. A method for communicating data using a wireless protocol, comprising:
   receiving, at an edge device, individual sets of data from a plurality of sensors;
   compiling, by the edge device, the individual sets of data into a single dataset that is to be processed by a backend device;
   generating, by the edge device, a first advertisement to include a first portion of the dataset and a first sequence identifier associated with the first portion;
   generating, by the edge device, a second advertisement to include a second portion of the dataset and a second sequence identifier associated with the second portion;
   broadcasting, with a communication setting of the edge device in a mode including a transmitting capability, the first advertisement;
   broadcasting, without receiving an acknowledgement associated with the first advertisement, the second advertisement to enable the backend device to process the first portion based on the first sequence identifier, the second portion based on the second sequence identifier, or a combination thereof;
   configuring the communication setting of the edge device to a mode including a receiving capability for a time period;
   receiving, from the backend device, an indication of one or more sequence identifiers associated with one or more advertisements that were not received; and
   retransmitting, based on the indication of the one or more sequence identifiers, the first advertisement, the second advertisement, or a combination thereof.

2. The method of claim 1, further comprising:
   broadcasting, without receiving an acknowledgement associated with the second advertisement, a completion indicator that indicates that all of the individual sets of data have been transmitted,
   wherein the communication setting of the edge device is configured to the mode including the receiving capability based on broadcasting the completion indicator.

3. The method of claim 2, further comprising:
   determining that a power level associated with the edge device satisfies a threshold,
   wherein the completion indicator is transmitted based on the power level satisfying the threshold.

4. The method of claim 2, further comprising:
   rebroadcasting the completion indicator based on not receiving the indication, of the one or more sequence identifiers that were not received, during the time period.

5. The method of claim 1, wherein the communication setting of the edge device is configured to the mode including the receiving capability based on broadcasting the second advertisement.

6. The method of claim 5, further comprising:
rebroadcasting the second advertisement based on not receiving the indication, of the one or more sequence identifiers that were not received, during the time period.

7. The method of claim 1, further comprising:
establishing a communication link with the backend device,
wherein the indication, of the one or more sequence identifiers that were not received, is received using the communication link.

8. The method of claim 7, wherein the communication link is established via a BLUETOOTH® Low-Energy (BLE) connection protocol.

9. The method of claim 7, wherein retransmitting the first advertisement, the second advertisement, or a combination thereof comprises:
transmitting the first portion of the dataset, the second portion of the dataset, or a combination thereof using the communication link.

10. The method of claim 1, wherein the first advertisement and the second advertisement are both BLUETOOTH® Low-Energy (BLE) advertisements.

11. The method of claim 1, wherein the first advertisement and the second advertisement are both broadcast via a BLUETOOTH® Low-Energy (BLE) advertisement protocol.

12. An edge device for communicating data using a wireless protocol, comprising:
one or more memories; and
one or more processors, communicatively coupled to the one or more memories, configured to:
receive individual sets of data from a plurality of sensors;
compile the individual sets of data into a single dataset that is to be processed by a backend device;
generate a first advertisement to include a first portion of the dataset and a first sequence identifier associated with the first portion;
generate a second advertisement to include a second portion of the dataset and a second sequence identifier associated with the second portion;
broadcast, with a communication setting of the edge device in a mode including a transmitting capability, the first advertisement;
broadcast, without receiving an acknowledgement associated with the first advertisement, the second advertisement to enable the backend device to process the first portion based on the first sequence identifier, the second portion based on the second sequence identifier, or a combination thereof;
configure the communication setting of the edge device to a mode including a receiving capability for a time period;
receive, from the backend device, an indication of one or more sequence identifiers associated with one or more advertisements that were not received; and
retransmit, based on the indication of the one or more sequence identifiers, the first advertisement, the second advertisement, or a combination thereof.

13. The edge device of claim 12, wherein the one or more processors are further configured to:
broadcast, without receiving an acknowledgement associated with the second advertisement, a completion indicator that indicates that all of the individual sets of data have been transmitted,
wherein the communication setting of the edge device is configured to the mode including the receiving capability based on broadcasting the completion indicator.

14. The edge device of claim 13, wherein the one or more processors are further configured to:
determine that a power level associated with the edge device satisfies a threshold,
wherein the completion indicator is transmitted based on the power level satisfying the threshold.

15. The edge device of claim 13, wherein the one or more processors are further configured to:
rebroadcast the completion indicator based on not receiving the indication, of the one or more sequence identifiers that were not received, during the time period.

16. The edge device of claim 12, wherein the communication setting of the edge device is configured to the mode including the receiving capability based on broadcasting the second advertisement.

17. The edge device of claim 16, wherein the one or more processors are further configured to:
rebroadcast the second advertisement based on not receiving the indication, of the one or more sequence identifiers that were not received, during the time period.

18. The edge device of claim 12, wherein the one or more processors are further configured to:
establish a communication link with the backend device,
wherein the indication, of the one or more sequence identifiers that were not received, is received using the communication link.

19. The edge device of claim 12, wherein, to retransmit the first advertisement, the second advertisement, or a combination thereof, the one or more processors are configured to:
transmit the first portion of the dataset, the second portion of the dataset, or a combination thereof using the communication link.

20. A tangible machine-readable medium storing a set of instructions, the set of instructions comprising:
one or more instructions that, when executed by one or more processors of a device, cause the device to:
receive, at the device, individual sets of data from a plurality of sensors;
compile, by the device, the individual sets of data into a single dataset that is to be processed by a backend device;
generate, by the device, a set of advertisements including two or more advertisements, where each advertisement includes a corresponding portion of the dataset and a corresponding sequence identifier associated with the corresponding portion;
broadcast, with a communication setting of an edge device in a mode including a transmitting capability, each advertisement in an order according to the corresponding sequence identifiers, wherein each successive advertisement of the set of advertisements is transmitted without receiving an acknowledgement of a preceding advertisement of the set of advertisements;
configure the communication setting of the edge device to a mode including a receiving capability for a time period;
receive, from the backend device, an indication of one or more sequence identifiers associated with a subset of the advertisements that were not received; and
retransmit, based on the indication of the one or more sequence identifiers, the subset of the set of advertisements.

21. A method for communicating data using a wireless protocol, comprising:
- (a) receiving, at an edge device, individual sets of data from a plurality of sensors;
- (b) compiling, by the edge device, the individual sets of data into a dataset that is to be processed by a backend device;
- (c) generating, by the edge device, a plurality of advertisements, each advertisement including a respective portion of the dataset and a respective sequence identifier, wherein, taken together, the respective portions of the plurality of advertisements comprise the dataset;
- (d) broadcasting, with a communication setting of the edge device in a mode including a transmitting capability, at least some of the plurality of advertisements, wherein the broadcasting is performed without receiving an acknowledgement associated with any advertisement of the at least some of the plurality of advertisements being received by a receiving device;
- (e) configuring the communication setting of the edge device to a mode including a receiving capability for a predetermined time period;
- (f) receiving, at the edge device for the predetermined time period from the receiving device, at least one of (i) an indication of one or more of the plurality of advertisements not having been received; (ii) an indication that all of the plurality of advertisements have been received; or (iii) no indication; and
- (g) responsive to receiving the (i) indication of the one or more of the plurality of advertisements not having been received, broadcasting, with the communication setting of the edge device in the mode including the transmitting capability, the one or more of the plurality of advertisements not having been received, wherein the broadcasting is performed without receiving an acknowledgement associated with any advertisement of the one or more of the plurality of advertisements not having been received.

22. The method of claim 21, further comprising
repeating steps (e)-(g) until, in step (f), the edge device receives at least one of the (ii) the indication that all of the plurality of advertisements have been received or (iii) no indication.

23. The method of claim 21, wherein step (f) further comprises:
establishing a communication link with the backend device,
wherein (i) the indication of one or more of the plurality of advertisements not having been received, or (ii) the indication that all of the plurality of advertisements have been received, is received using the communication link.

24. The method of claim 21, wherein step (d) further comprises:
broadcasting a completion indicator that indicates that all of the individual sets of data have been transmitted,
wherein the communication setting of the edge device is configured to the mode including the receiving capability based on broadcasting the completion indicator.

25. The method of claim 24, wherein step (d) further comprises:
determining that a power level associated with the edge device satisfies a threshold,
wherein the completion indicator is transmitted based on the power level satisfying the threshold.

* * * * *